United States Patent [19]
Gonidec et al.

[11] Patent Number: 6,029,439
[45] Date of Patent: Feb. 29, 2000

[54] GAS FLOW GUIDE FOR AN AIRCRAFT THRUST REVERSER

[75] Inventors: Patrick Gonidec, Montivilliers; Pascal Gérard Rouyer, Saint Aubin Routot; Guy Bernard Vauchel, Le Havre, all of France

[73] Assignee: Societe Hispano-Suiza, France

[21] Appl. No.: 08/988,957

[22] Filed: Dec. 11, 1997

[30] Foreign Application Priority Data

Dec. 12, 1996 [FR] France .................................. 96 15256

[51] Int. Cl.⁷ ........................................... F02K 1/64
[52] U.S. Cl. ..................... 60/226.2; 60/230; 244/110 B; 239/265.29
[58] Field of Search ..................... 60/226.2, 230; 244/110 B; 239/265.25, 265.27, 265.29, 265.31

[56] References Cited

U.S. PATENT DOCUMENTS

| | | |
|---|---|---|
| 3,279,182 | 10/1966 | Helmintoller . |
| 3,605,411 | 9/1971 | Maison et al. . |
| 4,894,985 | 1/1990 | Dubois et al. . |
| 4,914,905 | 4/1990 | Dubois et al. . |
| 4,960,243 | 10/1990 | Dubois et al. . |
| 4,976,466 | 12/1990 | Vauchel . |
| 5,039,171 | 8/1991 | Lore . |
| 5,090,197 | 2/1992 | Dubois ................................... 60/226.2 |
| 5,297,387 | 3/1994 | Carimali et al. . |
| 5,765,362 | 6/1998 | Gonidec et al. ........................ 60/226.2 |

FOREIGN PATENT DOCUMENTS

| | | |
|---|---|---|
| 0 338 869 | 10/1989 | European Pat. Off. . |
| 0 352 171 | 1/1990 | European Pat. Off. . |
| 0 365 425 | 4/1990 | European Pat. Off. . |
| 0 413 635 | 2/1991 | European Pat. Off. . |
| 1482538 | 5/1967 | France . |
| 2030034 | 10/1970 | France . |
| 2 618 853 | 2/1989 | France . |
| 2 680 547 | 2/1993 | France . |

*Primary Examiner*—Ted Kim
*Attorney, Agent, or Firm*—Bacon & Thomas PLLC

[57] ABSTRACT

A gas flow guide is disclosed for an aircraft jet engine thrust reverser having a thrust reverser door movably connected to a cowling so as to move between forward and reverse thrust positions, the cowling having a reverse thrust opening bounded by a forward edge having a deflector, an opposite lateral side edges, an inner surface of the cowling forming an outer boundary of a gas flow duct, a forward inner surface of the thrust reverser door tapering toward an outer surface so as to form a cavity opening into the gas flow duct when the thrust reverser door is in the forward thrust position, wherein the gas flow guide has at least one guide vane connected to the cowling so as to be located within the cavity when the thrust reverser door is in the forward thrust position and located rearwardly of the deflector extending from the forward edge so as to guide the gas passing through the reverse thrust opening when the thrust reverser door is in the reverse thrust position.

7 Claims, 8 Drawing Sheets

GAS FLOW GUIDE FOR AN AIRCRAFT THRUST REVERSER

BACKGROUND OF THE INVENTION

The present invention relates to a gas flow guide for an aircraft jet engine thrust reverser in which a guide vane is disposed in a reverse thrust opening in the engine cowling to direct the gas flowing through the opening during reverse thrust operation.

Turbofan-type turbojet engines are well known in the art and typically comprise a fan driven at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the cowling of a turbofan-type turbojet engine. As illustrated in FIG. 1, the upstream portion of the cowling which defines the outer limits of the bypass flow duct and which is generally concentrically arranged about the turbojet engine (not shown) is designated as 1 and generally comprises an external cowling panel and an internal cowling panel interconnected by a frame 6. The outer surface of the external cowling panel has an aerodynamic surface over which the air external to the engine passes during aircraft flight. The inner surface of the inner cowling panel defines the outer boundary of the bypass flow duct 15 through which the bypass flow passes in the direction of arrow 14.

The cowling also comprises a thrust reverser and a downstream cowling portion 3. The thrust reverser comprises a door 7 pivotally attached to the cowling so as to pivot about transverse axis 20 such that it is movable between a closed, forward thrust position, illustrated in FIG. 1, and an open, reverse thrust position, illustrated in FIG. 2, in which the forward end of the thrust reverser door 7 is moved outwardly from the cowling, while a rear portion is moved inwardly into the bypass flow duct so as to redirect at least a portion of the bypass flow through an opening in the cowling in a direction that has a reverse thrust component.

A known actuator for moving the door 7 between its forward thrust and reverse thrust positions may comprise a hydraulic cylinder extending through and mounted to the frame 6, and having an extendible and retractable piston rod connected to the thrust reverser door 7.

The thrust reverser door 7 has an inner door panel or inner surface 11 and the forward end of the door 7 may have a baffle 13 to maximize the efficiency of the thrust reverser when the door 7 is in the reverse thrust position. The inner surface 11 tapers toward the outer surface of the door 7 at the forward end of the door, forming cavity 18 when in the forward thrust position.

A plurality of thrust reverser doors 7 may be incorporated into the cowling, such doors being circumferentially spaced around the periphery of the cowling. A portion of the cowling extends axially between a forward part and a rear part of the cowling adjacent thrust reverser doors 7 to provide structural rigidity to the cowling and to provide pivot mounting points for attaching the doors 7 to the cowling. French Patents 1,482,538 and 2,030,034 illustrate typical, known thrust reversers.

U.S. Pat. No. 3,605,411 discloses a pivoting door-type thrust reverser in which the baffle mounted to the upstream or forward end of the thrust reverser door is movable to an extended position when the door is in the reverse thrust position.

French Patent 2,618,853 discloses a thrust reverser in which the baffle is retracted when the door is in its forward thrust position to optimize engine performance.

In some applications, as illustrated in FIG. 1, the baffle 13 projects from the inner panel 11 of the thrust reverser door 7 even when the door is in its forward thrust position without extending into the bypass flow duct. This forms a cavity 18 facing inwardly into the bypass flow duct which will slightly degrade engine performance.

French Patent 2,680,547 discloses a thrust reverser having a combination of spoilers and baffles to attempt to optimize the direction of exhaust flow.

A deflector 8 extends from the portion of the cowling forming the forward edge of the reverse thrust opening and may have a curved distal end portion, as illustrated in FIGS. 1 and 2, or may be planar in configuration, as illustrated in FIG. 3. The curved deflector 8 illustrated in FIGS. 1 and 2 permits better gas flow during reverse thrust operation to thereby achieve an optimal effective cross-sectional length P in the reverse thrust mode. However, this design incurs aerodynamic losses degrading the performance of the engine when the thrust reverser door 7 is in the forward thrust position, because the gases in the annular duct 15 are guided into the cavity 18. The planar deflector 8 illustrated in FIG. 3 minimizes these losses since the planar configuration covers a portion of the cavity 18 to thereby reduce the disturbances in the gas flow.

However, using such a deflector reduces the effective cross-sectional length P during reverse thrust operation, since the gas passing through the reverse thrust opening is no longer guided by the curved deflector edge. In order to achieve the same effectiveness in the flat deflector as with a curved deflector, the distance between the deflection edge and the inside surface 11 of the door 7 making contact with the reverse thrust gases must be increased. However this solution causes additional problems in that the pivot axis 20 must be shifted more towards the rear of the cowling thereby increasing the axial length of the inner surface 11 extending forwardly of the pivot axis 20. The increase of this distance also increases the forces acting on the door by the pressurized gases within the gas flow duct 15 which tend to urge the thrust reverser door 7 away from the forward thrust position.

SUMMARY OF THE INVENTION

A gas flow guide is disclosed for an aircraft jet engine thrust reverser having a thrust reverser door movably connected to a cowling so as to move between forward and reverse thrust positions, the cowling having a reverse thrust opening bounded by a forward edge having a deflector, an opposite lateral side edges, an inner surface of the cowling forming an outer boundary of a gas flow duct, a forward inner surface of the thrust reverser door tapering toward an outer surface so as to form a cavity opening into the gas flow duct when the thrust reverser door is in the forward thrust position, wherein the gas flow guide has at least one guide vane connected to the cowling so as to be located within the cavity when the thrust reverser door is in the forward thrust position and located rearwardly of the deflector extending from the forward edge so as to guide the gas passing through the reverse thrust opening when the thrust reverser door is in the reverse thrust position.

An object of the present invention is to have as small a distance as possible between the rear edge of the deflector and the inner surface of the thrust reverser door, while preserving the benefits of the deflector having a curved deflector edge. Another objective is to reduce the opening effects of the pressurized gases acting on the inner surface of the door forwardly of the door pivot axis by minimizing the forward length of the door relative to the pivot axis.

DETAILED DESCRIPTION OF THE PREFERRED EMBODIMENTS

Figure 4:
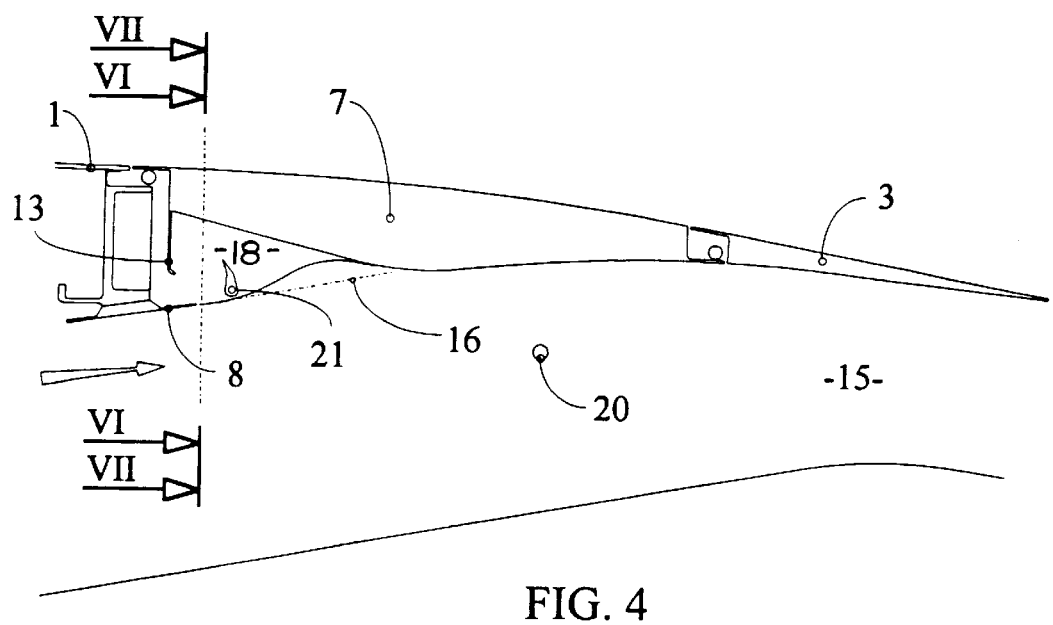
FIG. 4 is a longitudinal, cross-sectional view of a thrust reverser incorporating the guide vane according to the present invention.
Figure 5:
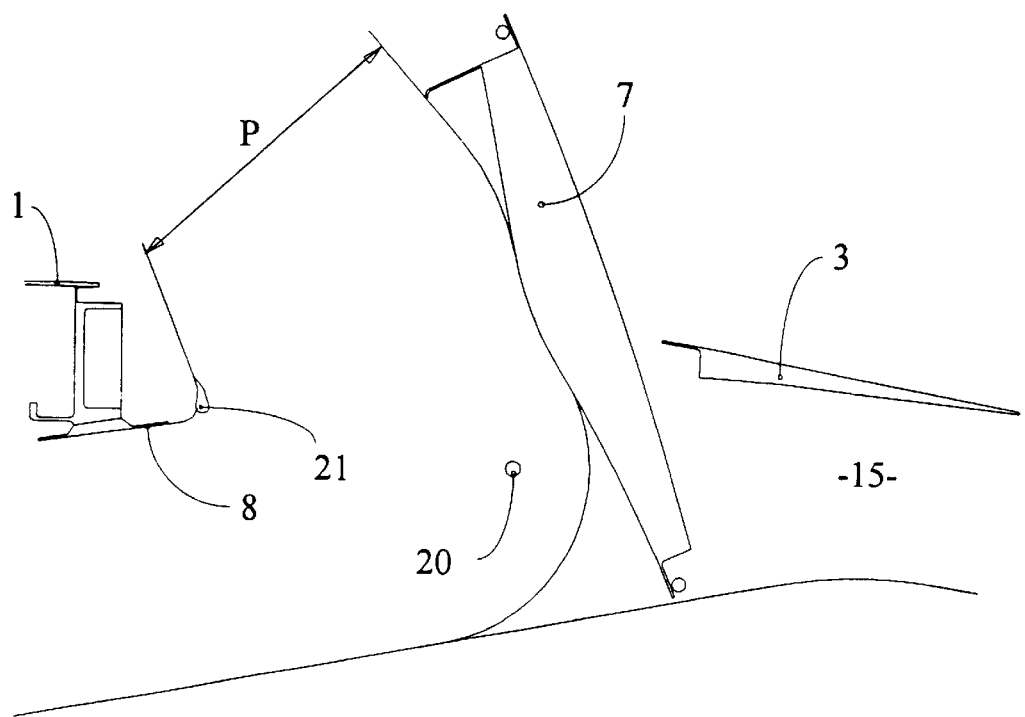
FIG. 5 is a view similar to FIG. 4, but illustrating the thrust reverser door in the reverse thrust position.
Figure 6:
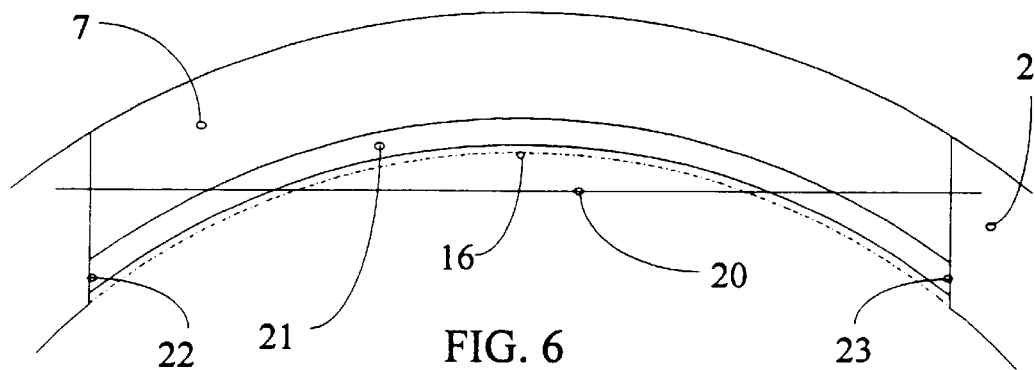
FIG. 6 is a transverse, cross-sectional view taken along line VI—VI in FIG. 4.

A first embodiment of the present invention is illustrated in FIGS. 4–6 wherein it can be seen that a guide vane 21 having an aerodynamic cross-sectional configuration is located within the cavity 18 when the thrust reverser door 7 is in the forward thrust position. The guide vane 21 is located rearwardly of the rearmost portion of the deflector 8.

The guide vane 21 may contact a line 16 extending between the inner surface of the deflector and the inner, rear surface of the thrust reverser door 7, which line forms an innermost boundary of the cavity 18. In this location, the guide vane 21 is outwardly of the gas flow through the duct 15 when the thrust reverser door 7 is in the forward thrust position and, therefore, does not cause any disturbances in this gas flow. The guide vane 21 has an aerodynamic cross-sectional configuration which may be varied depending upon the desired purpose of each particular application. The vanes may be located in each of a plurality of reverse thrust openings in a cowling and each vane may have the same cross-sectional configuration, or the vanes may have differing cross-sectional configurations depending upon the reverse thrust parameters for each reverse thrust opening.

Figure 7:
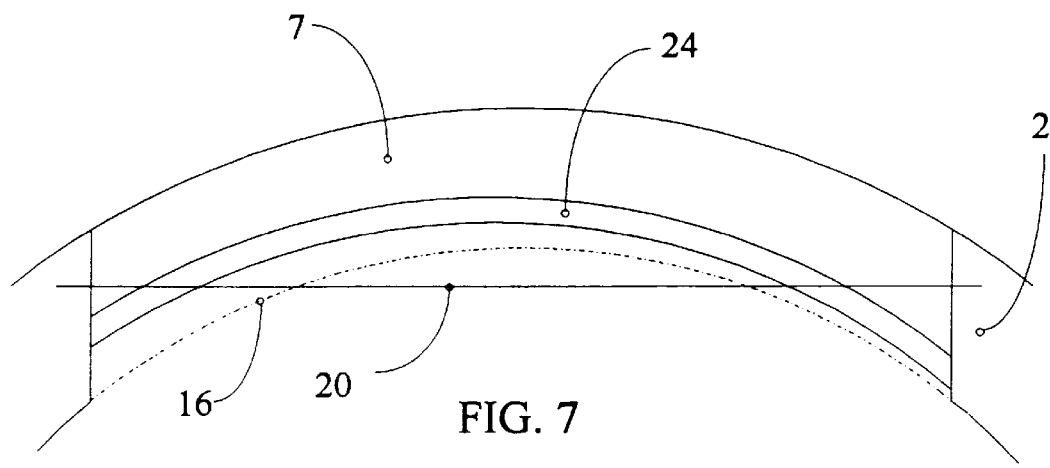
FIG. 7 is a view similar to FIG. 6, illustrating a variation in the configuration of the guide vane.

As illustrated in FIG. 6, the guide vane 21 may have an arcuate configuration centered on the center line of the cowling. Alternatively, a guide 24, illustrated in FIG. 7 may have an arcuate configuration in which the center of curvature of the arc is displaced from the longitudinal center of the cowling. The guide vane 21, 24 may extend between opposite lateral side edges 22 and 23 bounding the reverse thrust opening between longitudinally extending cowling portions 2 interposed between circumferentially spaced apart thrust reverser doors 7.

As an alternative, the transverse dimension of the guide vane 21, 24 may be less than the transverse distance between the opposite lateral side edges 22 and 23. In such instances, the guide vane 21, 24 may be mounted by supports to the deflector 8, or may be attached, also by supports, to a desired portion of the cowling.

Figure 1:
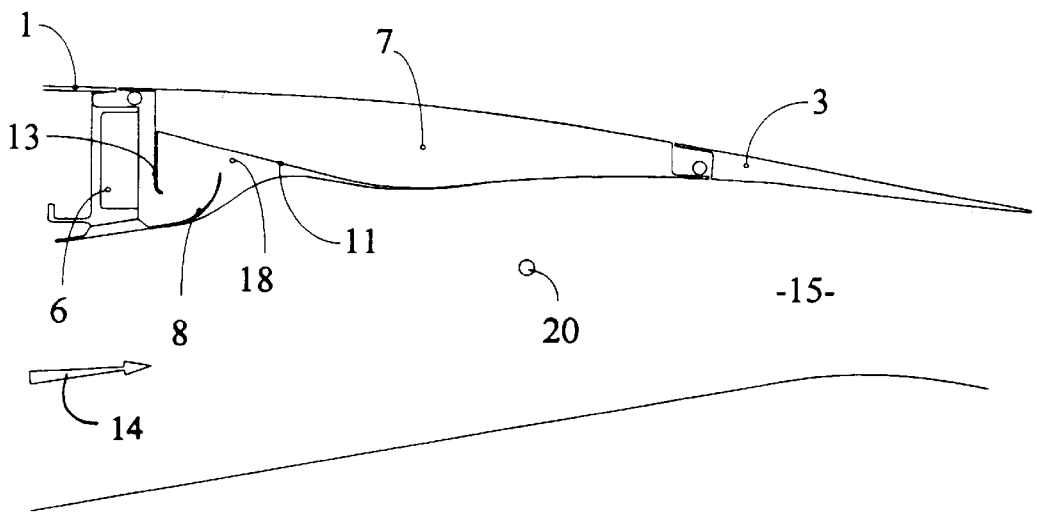
FIG. 1 is a partial, longitudinal, cross-sectional view of a known type of thrust reverser with the thrust reverser door in the forward thrust position.
Figure 2:
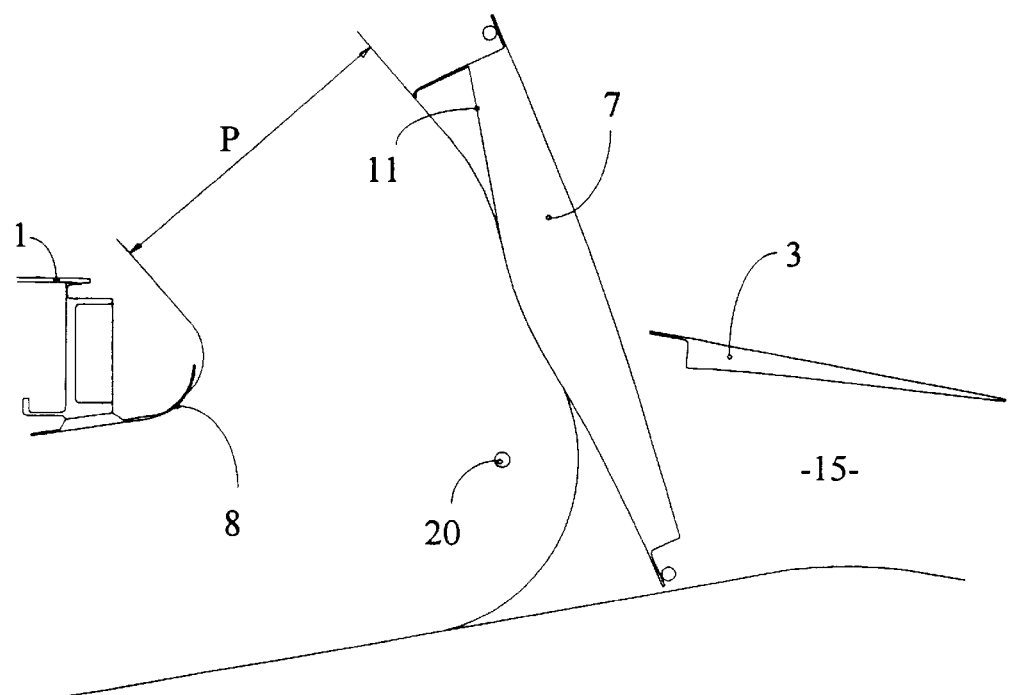
FIG. 2 is a view similar to FIG. 1, but illustrating the thrust reverser door in the reverse thrust position.
Figure 3:
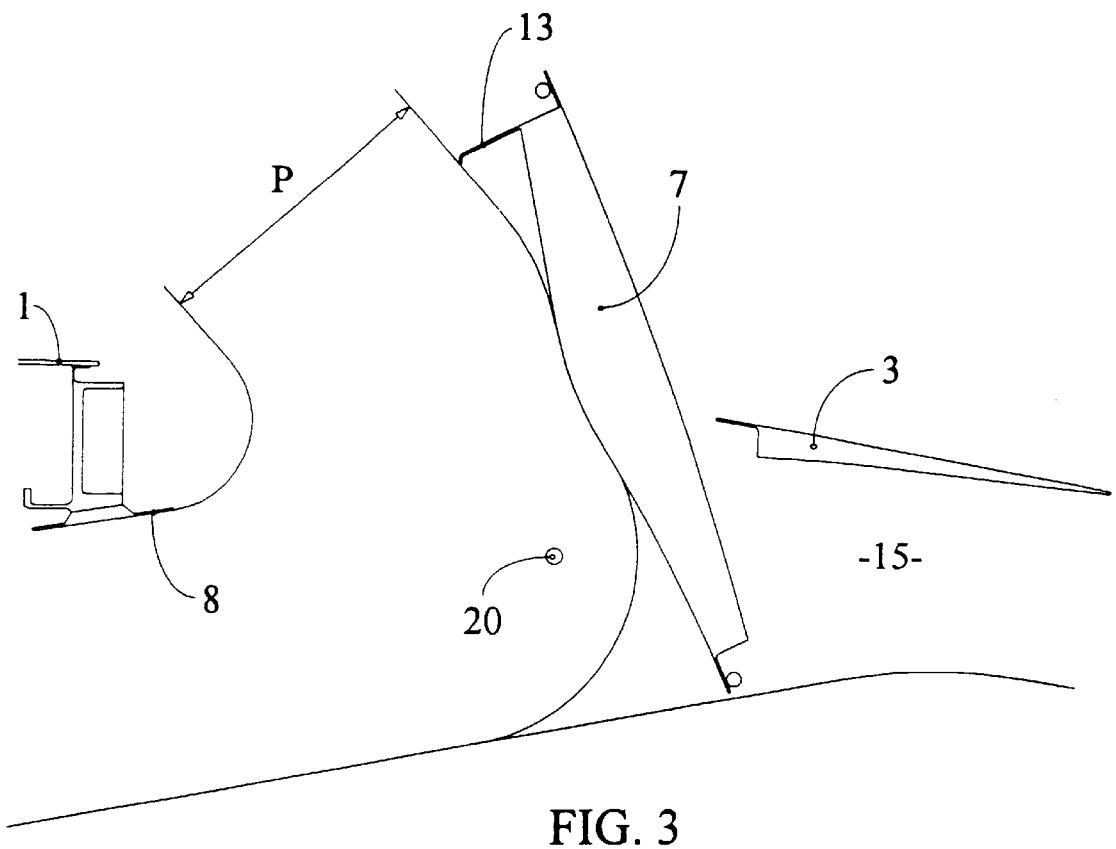
FIG. 3 is a view similar to FIG. 2 illustrating another type of known thrust reverser.
Figure 8:
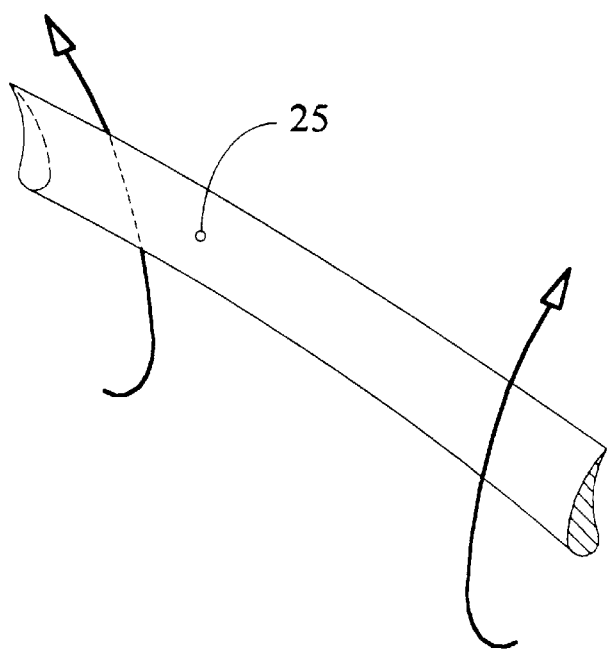
FIG. 8 is a perspective view of an alternative embodiment of a guide vane according to the present invention.

The aerodynamic cross-sectional configuration of the guide vane may be constant across its lateral dimensions, as with guide vanes 21, 24. However, such cross-sectional configuration may vary across the lateral width of the guide vane, as illustrated by guide vane 25 in FIG. 8. Such variations may occur wherein it is desired to impart a specific direction to the reverse thrust gas flow.

Although a single guide vane 21, 24, 25 has been described, it is to be understood that a plurality of such guide vanes may be utilized in a given reverse thrust opening. The plurality of guide vanes may be connected to one another, or each may be independently connected to the deflector edge, or to the cowling. If a plurality of guide vanes are utilized, it is to be understood that the guide vanes may each have a different aerodynamic cross-sectional configurations depending upon the desired characteristics of the reverse thrust gas flow.

Although the guide vane has been thus described as being utilized in conjunction with a flat, planar deflector 8, it may also be utilized with a deflector 8 having a curved distal edge portion as long as the guide vane is positioned within the cavity 18 such that it does not disrupt the gas flow through the duct 15 when the thrust reverser door 7 is in the forward thrust position.

During thrust reversal, the guide vane may further improve the aerodynamic performance offered by the deflector having the curved edge portion.

Figure 9:
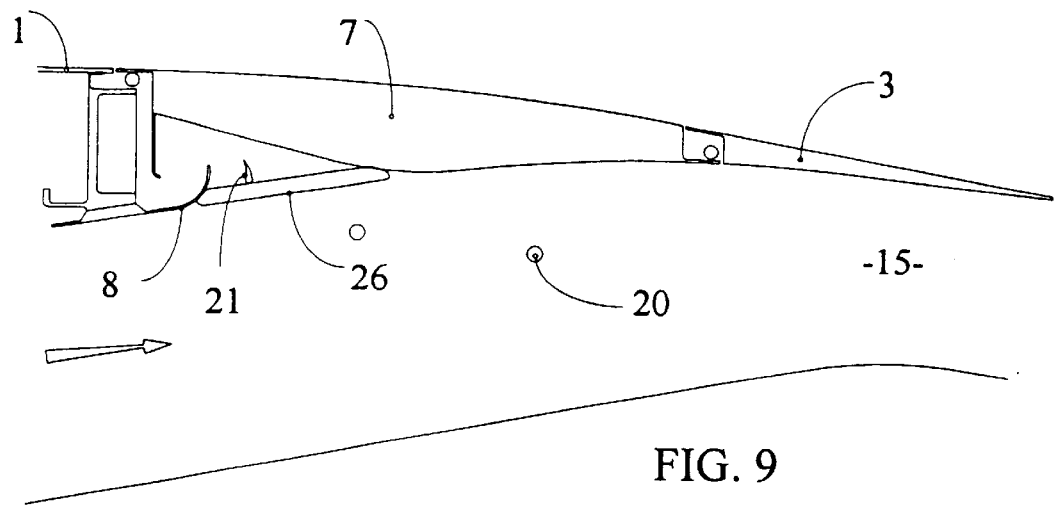
FIG. 9 is a view similar to FIG. 4 illustrating the use of the guide vane according to the present invention with a thrust reverser incorporating a movable panel.
Figure 10:
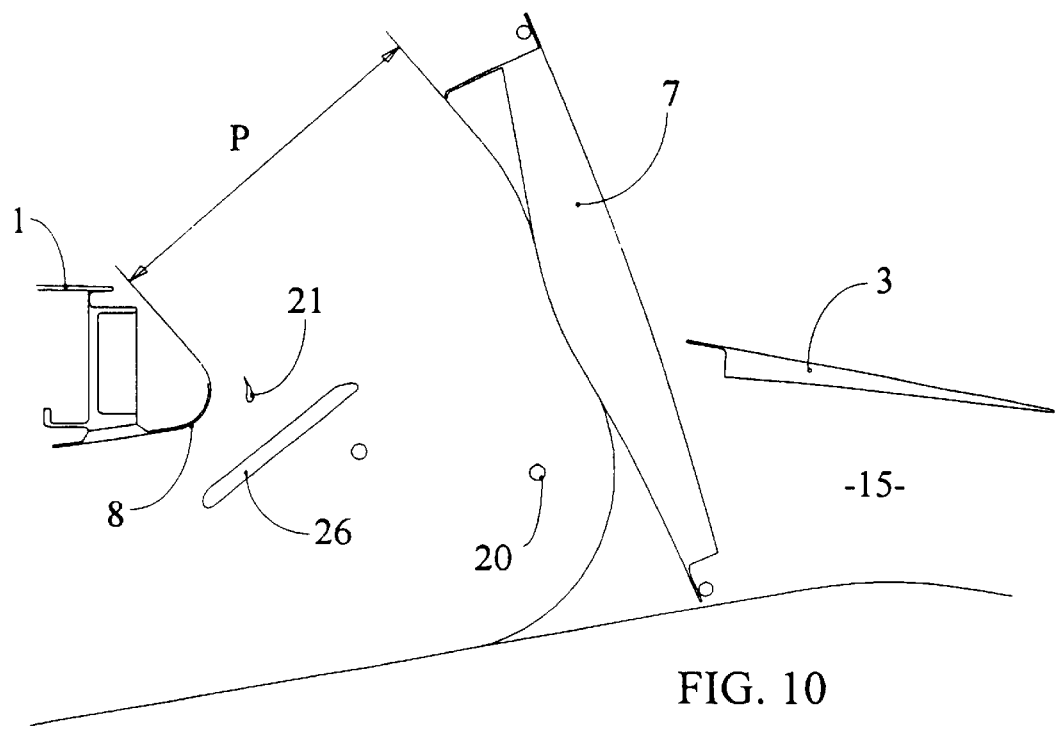
FIG. 10 is a view similar to FIG. 9, illustrating the thrust reverser door and the movable panel in their reverse thrust positions.

The guide vane may also be utilized in conjunction with thrust reversers having a movable panel that, in a reverse thrust position, partially extends into the gas flow duct 15 to assist in the redirection of the gases outwardly through the reverse thrust opening, as illustrated in FIGS. 9 and 10. When the thrust reverser door 7 and the panel 26 are in their forward thrust positions, the panel 26 forms a barrier extending between the deflector 8 and the rearward inner surface of the door 7 so as to prevent gases in the gas flow duct 15 from entering the cavity. In this position, the guide vane 21 may act as a stop bearing against a surface of the panel 26 so as to properly position the panel. During reverse thrust operation, the forward portion of the panel 26 is displaced away from the deflector 8 into the gas flow duct 15 so as to assist in the redirection of the gases outwardly through the reverse thrust opening. Such gas is also deflected by the guide vane 21 to maximize the affective cross-sectional length P. When in the forward thrust position, the panel 26 is subjected to forces exerted by the pressurized gases against its inner surface which may, in some instances, outwardly deform the panel. The guide vane 21 will prevent such deformation since it acts as a stop against the panel 26.

Figure 11:
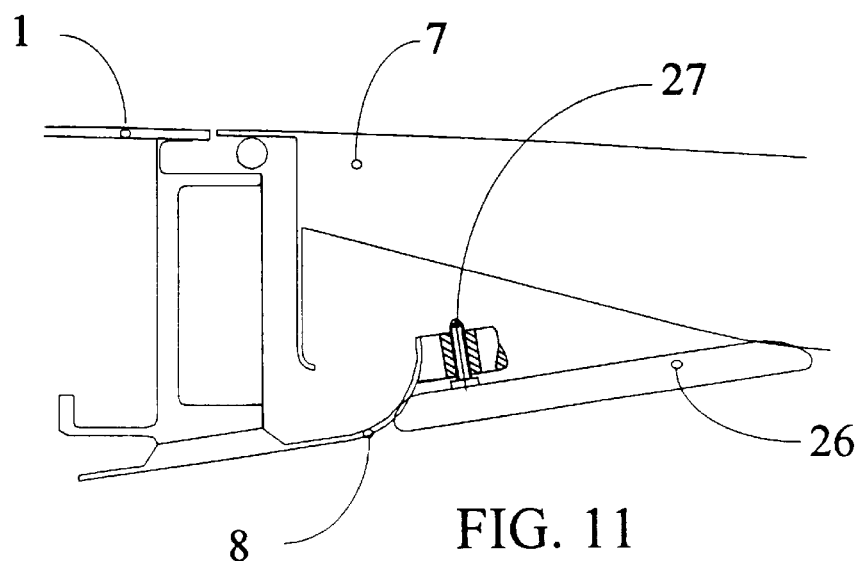
FIG. 11 is partial, enlarged, cross-sectional view illustrating a guide vane incorporating an adjustable stop to limit the movement of the movable panel when in the forward thrust position.

A variation of this embodiment is illustrated in FIG. 11 wherein the guide vane is attached to the deflector 8 by a mounting support, to which is attached an adjustable stop 27. The position of stop 27 relative to the guide vane is adjustable so as to accurately adjust the forward thrust position of the panel 26 while at the same time locating the guide vane in the most advantageous position.

Figure 12:
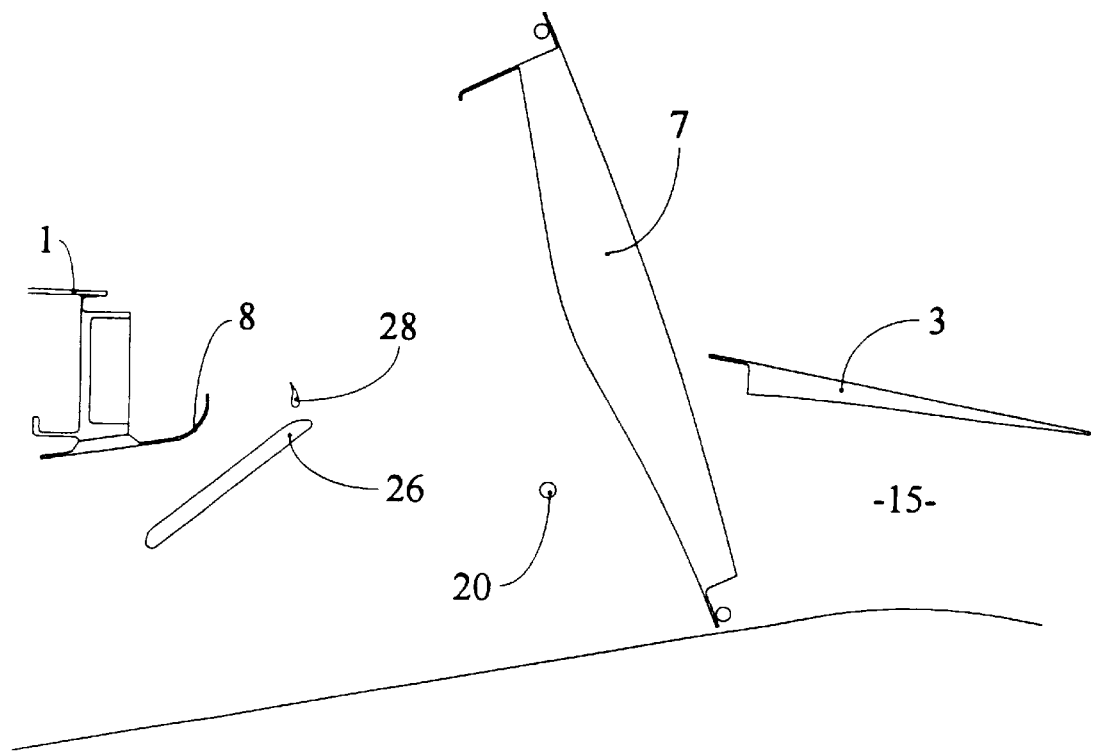
FIG. 12 is a view similar to FIG. 10, but illustrating a different type of movable panel associated with the guide vane.

As best seen in FIG. 12, the guide vane 28 may be located adjacent to the rearmost edge of the movable panel 26 when the panel is in the forward thrust position to improve the thrust reversal effectiveness of the panel 26 by acting as an extension of this panel.

Figure 13:
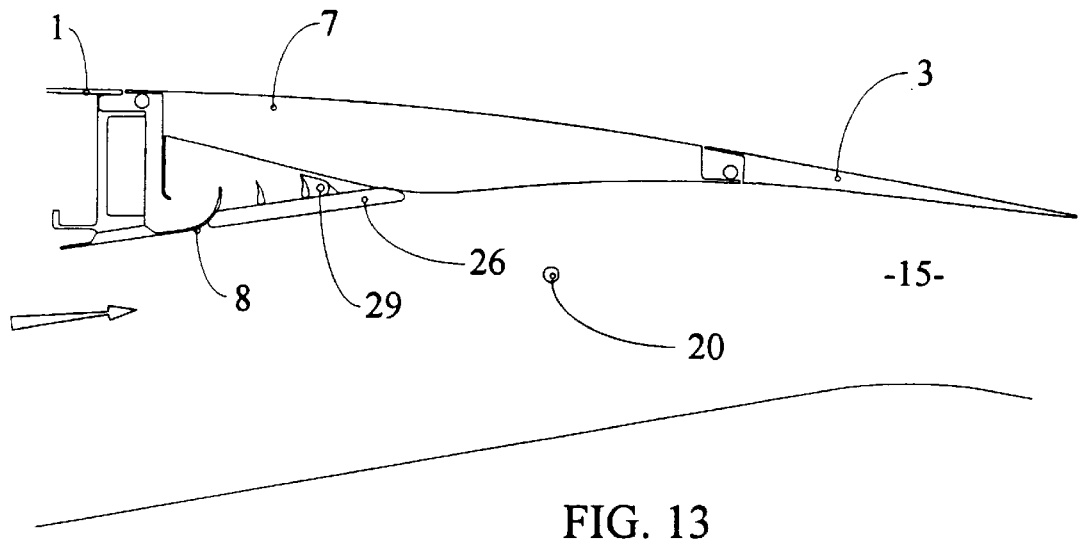
FIG. 13 is a view similar to FIG. 9 illustrating the movable panel pivotally connected to a guide vane.
Figure 14:
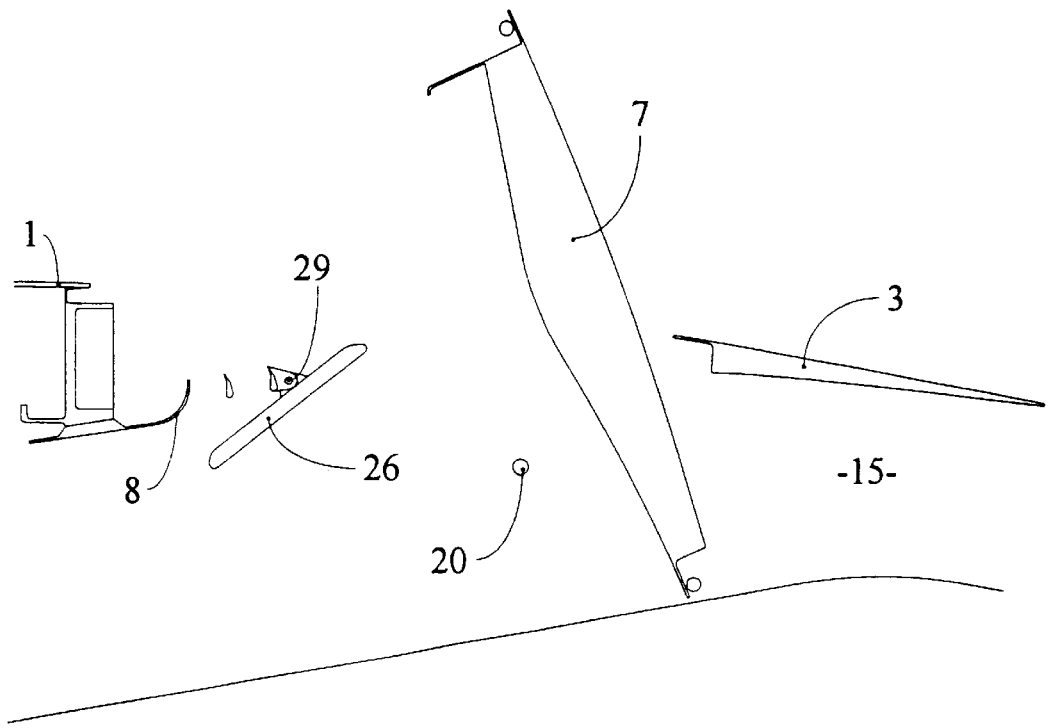
FIG. 14 is a view similar to FIG. 13, but illustrating the thrust reverser door and the movable panel in their reverse thrust positions.

An alternative embodiment is illustrated in FIGS. 13 and 14 in which the movable panel 26 is pivotally attached to a guide vane by pivots 29. Pivots 29 may extend through corresponding mounting supports extending from the guide vane and the mounting panel. In all of the embodiments incorporating a movable panel, the movable panel can be moved between its forward and reverse thrust positions by known means, such as a separate actuator, or a linkage connecting it to the thrust reverser door.

Figure 15:
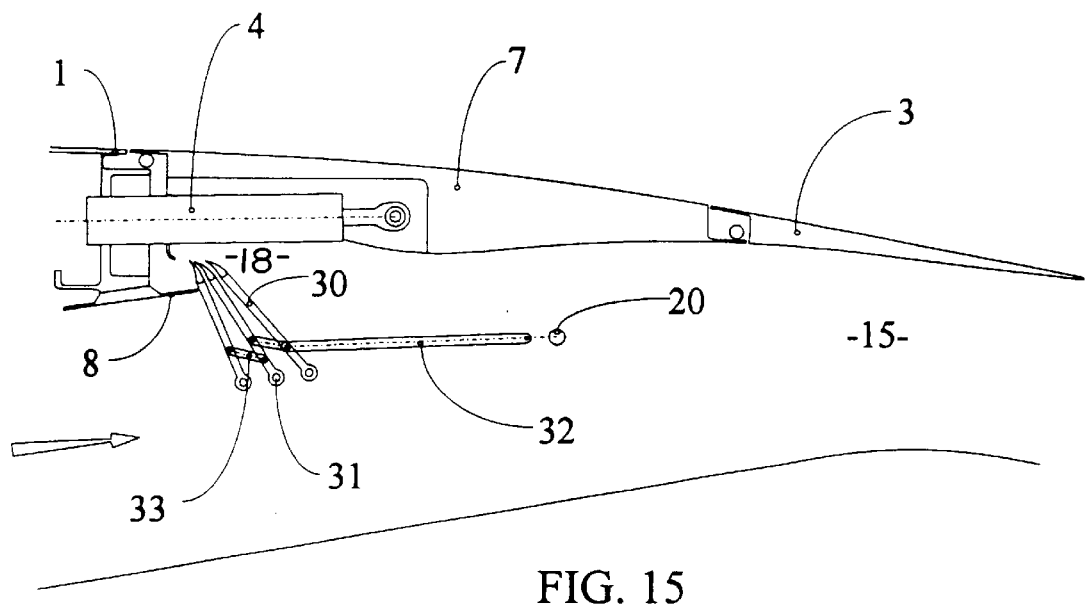
FIG. 15 is a cross-sectional view similar to FIG. 9, illustrating a variation in which the guide vanes are pivotally attached to the cowling.
Figure 16:
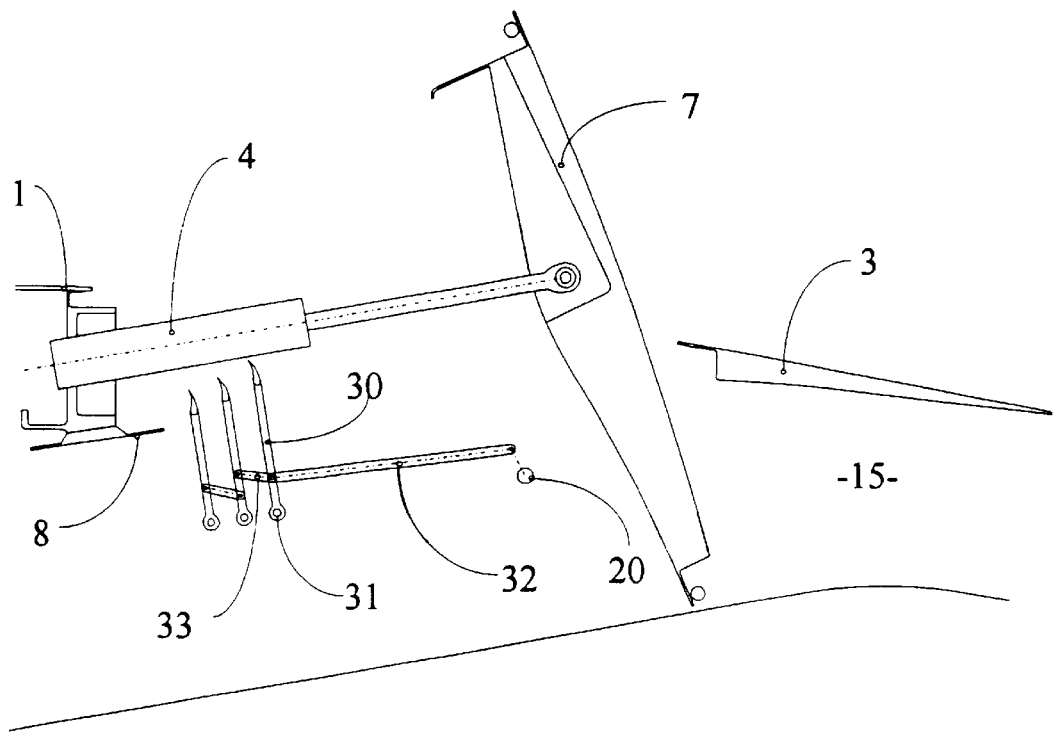
FIG. 16 is a view similar to FIG. 15, but illustrating the thrust reverser door 7 in the reverse thrust position.

The guide vanes according to the present invention may also be pivotally attached to the cowling structure, as illustrated in FIGS. 15 and 16. In this embodiment, the guide vanes 30 are pivotally attached to opposite lateral side edges bounding the reverse thrust opening at pivots 31. If a plurality of guide vanes are utilized, as illustrated in FIGS. 15 and 16, the guide vanes may be connected together by linkrods 33 and one of the guide vanes may be connected to the thrust reverser door 7 by a linkage mechanism 32. During the forward thrust operating mode, illustrated in FIG. 15, the guide vanes are moved forwardly in the cavity 18 so as to avoid creating disturbances with the gas flow passing through the duct 15. During thrust reversal, the guide vanes are moved rearwardly such that they may effectively guide the gases passing through the reverse thrust opening. In known fashion, an actuator 4 may be connected between the cowling 1 and the thrust reverser door 7 to move the thrust reverser door 7 between its forward and reverse thrust positions. Linkage 32 may be connected to a crank arm or the like, also pivoting about door pivot axis 20 to move the guide vanes between their respective forward and reverse thrust positions. In this embodiment, the forwardmost vanes, when in the positions illustrated in FIG. 15, may be made larger than the rearwardly located guide vanes, since the dimensions in the forward part of the cavity 18 are larger than those to the rear.

As a variation of this embodiment, the guide vanes may be freely pivotable about pivots 31 and movable between the positions illustrated in FIGS. 15 and 16 solely by aerodynamic forces. A stop may be provided to limit their motion to the rear and to properly locate them for the most efficient thrust reversal operation. They may be moved back to their forward thrust position by the thrust reverser door.

The foregoing description is provided for illustrative purposes only and should note be construed as in any way limited this invention, the scope of which is defined solely by the appended claims.

We claim:

1. A gas flow guide for an aircraft jet engine thrust reverser having a thrust reverser door movably connected to a cowling so as to move between forward and reverse thrust positions, the cowling having a reverse thrust opening bounded by a forward edge having a deflector, and by opposite lateral side edges, an inner surface of the cowling forming an outer boundary of a gas flow duct, a forward inner surface of the thrust reverser door tapering toward an outer surface of the thrust reverser door such that a cavity is defined between the forward inner surface and the outer boundary of the gas flow duct, the cavity opening into the gas flow duct when the thrust reverser door is in the forward thrust position, the gas flow guide comprising at least one stationary guide vane located rearwardly of the forward edge deflector and in the cavity when the thrust reverser door is in the forward thrust position, the at least one guide vane having a cross-sectional configuration of a teardrop the at least one guide vane being stationary at least with respect to the cowling and arranged to guide the gas passing through the reverse thrust opening when the thrust reverser door is in the reverse thrust position.

2. The gas flow guide of claim 1 wherein the at least one guide vane has a uniform aerodynamic cross-sectional configuration.

3. The gas flow guide of claim 1 wherein the at least one guide vane has differing aerodynamic cross-sectional configurations across a lateral width of the guide vane.

4. The gas flow guide of claim 1 wherein the at least one guide vane extends across the reverse thrust opening between the opposite lateral sides.

5. The gas flow guide of claim 1 wherein the at least one guide vane extends only a portion of a distance between the opposite lateral side edges of the reverse thrust opening.

6. The gas flow guide of claim 1 wherein the at least one guide vane is attached to the forward edge deflector.

7. The gas flow guide of claim 1 wherein the at least one guide vane is attached to the opposite lateral side edges of the cowling.

* * * * *

UNITED STATES PATENT AND TRADEMARK OFFICE
CERTIFICATE OF CORRECTION

PATENT NO. : 6,029,439
DATED : February 29, 2000
INVENTOR(S) : Gonidec et al.

It is certified that error appears in the above-indentified patent and that said Letters Patent is hereby corrected as shown below:

Column 2, line 58, change "a cowling" to -- an engine cowling --.

Column 6, lines 21, change "a cowling" to -- an engine cowling --.

Signed and Sealed this

Twentieth Day of March, 2001

Attest:

NICHOLAS P. GODICI

Attesting Officer     Acting Director of the United States Patent and Trademark Office